United States Patent [19]

Ely

[11] Patent Number: 4,660,545
[45] Date of Patent: Apr. 28, 1987

[54] SOLAR CONDUCTIVE SPA WATER HEATER AND SAFETY COVER

[76] Inventor: Glen W. Ely, P.O. Box 5176, Gulfport, Fla. 33737-5176

[21] Appl. No.: 766,159

[22] Filed: Aug. 15, 1985

[51] Int. Cl.$^4$ .................................................. F24J 3/02
[52] U.S. Cl. .................................... 126/452; 126/415; 126/445; 4/493; 4/498
[58] Field of Search ............... 126/415, 426, 445, 448, 126/452; 4/493, 498, 499, 503; 165/46

[56] References Cited

U.S. PATENT DOCUMENTS

| | | | |
|---|---|---|---|
| 3,022,781 | 2/1962 | Andrassy | 126/426 |
| 4,078,293 | 3/1978 | Aine | 4/493 X |
| 4,079,726 | 3/1978 | Voelker | 126/415 |
| 4,103,368 | 8/1978 | Lockshaw | 126/415 |
| 4,190,038 | 2/1980 | Heitland et al. | 126/445 |
| 4,236,259 | 12/1980 | Wendt | 4/498 |
| 4,256,087 | 3/1981 | Sowers | 126/415 |
| 4,270,232 | 6/1981 | Ballew | 4/498 |
| 4,312,323 | 1/1982 | Domenech | 126/415 |
| 4,422,192 | 12/1983 | Jacobs | 4/498 |

FOREIGN PATENT DOCUMENTS 23285  2/1981  European Pat. Off. ............ 126/415

Primary Examiner—Margaret A. Focarino
Attorney, Agent, or Firm—Herbert W. Larson; Joseph C. Mason, Jr.

[57] ABSTRACT

Solar heated spa cover made from vacuum formed plastic material to form a first piece with a series of interconnected parallel U-shaped channels and a second top piece solvent or heat welded to the top of walls separating the channels. The spa water is heated by circulating water from and to the spa through the channels of the spa cover.

5 Claims, 5 Drawing Figures

SOLAR CONDUCTIVE SPA WATER HEATER AND SAFETY COVER

A. TECHNICAL FIELD

This invention relates to solar heated devices. More particularly, it refers to a solar heated plastic portable cover and a method for providing hot water to a spa.

B. BACKGROUND ART

Spas and hot tubs have become popular home use items during the last decade. Those designed for indoor use are generally heated by auxiliary heaters powered by natural gas, propane or electricity. Outdoor spas are also commonly heated in the same manner, but could be heated using solar power such as employed for pools and shown in U.S. Pat. Nos. 3,970,069; 3,598,104; 4,312,323,; 3,411,163; 3,072,920; and 4,227,511.

Insulated covers for spas have been on the commercial market for several years and are used to reduce the energy costs associated with spa operation. Such covers have no means for heating water. Those persons who do not have elaborate solar roof top panels or space for solar racks have no current means for heating outdoor spas using energy conserving methods. Accordingly, a need exists for a solar heated spa cover which heats spa water and at the same time conserves energy.

SUMMARY OF THE INVENTION

I have invented a spa cover having an integral solar heating system which will circulate solar heated water from the spa cover to the spa water reservoir. The cover is a two piece rigid plastic panel. The bottom piece is vacuum formed in a series of interconnected parallel U-shaped channels with supporting walls separating the channels. A plastic cover piece conforming to the shape of the bottom piece is solvent or heat welded to a top surface of the walls. The cover is wider than the spa so the cover rests on the spa coping. Each channel in the bottom piece has an opening at each end through the wall so that water can move from channel to channel in a maze-like pattern. Inlet and outlet fittings connected to a first and last channel respectively allow the water to flow in and out of the cover from the spa water reservoir using a standard water circulating pump.

BRIEF DESCRIPTION OF THE DRAWINGS

The present invention may be further understood by those having ordinary skill in the art by reference to the following detailed description together with the accompanying drawings in which.

DETAILED DESCRIPTION OF THE PREFERRED EMBODIMENT

Figure 5:
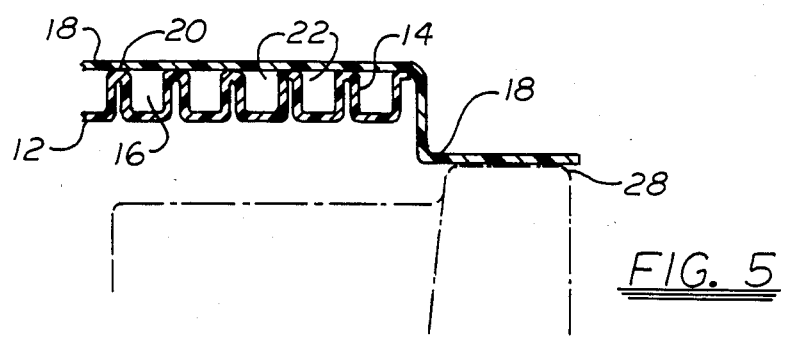
FIG. 5 is a cut away elevation view of the cover mounted on a spa coping.

The spa cover 10 is made by vacuum forming a rigid plastic material such as ABS or plexiglass into a bottom portion 12 having sidewalls 14 and channels 16 between the sidewalls 14. There is a break 22 at the end of each channel 16 so that the walls 14 do not reach the ends of the channels. A rigid top 18 is also made from a plastic material the same or different from the bottom portion 12. The top 18 is solvent welded or heat bonded to the top 22 of wall 16. See FIG. 5. The cover top 18 is large enough so that it covers the entire bottom 12 and overlaps so its edges will rest on the spa coping 28. The cover 10 can also be used in like manner in hot tubs and for purposes of this description the term "spa" is meant to include hot tubs.

Figure 1:
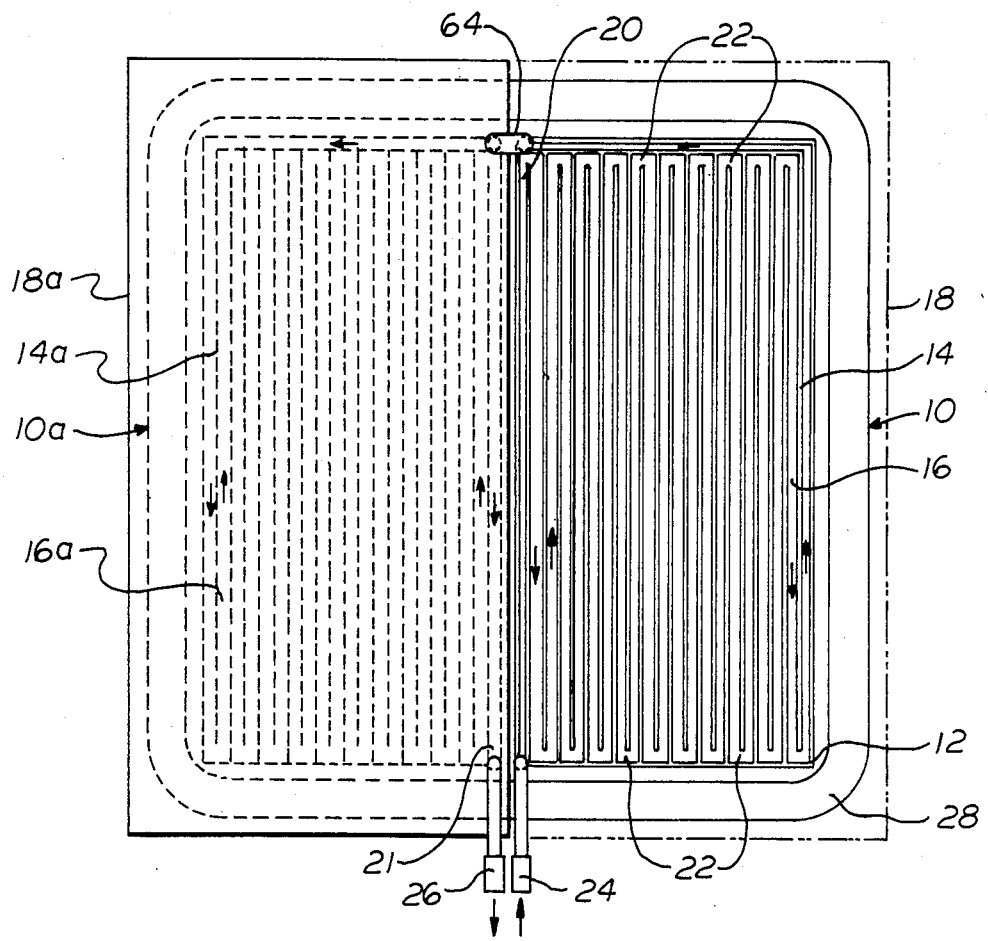
FIG. 1 is a cut away plan view of the right side and a phantom plan view of the channels in the left side of a spa cover.
Figure 3:
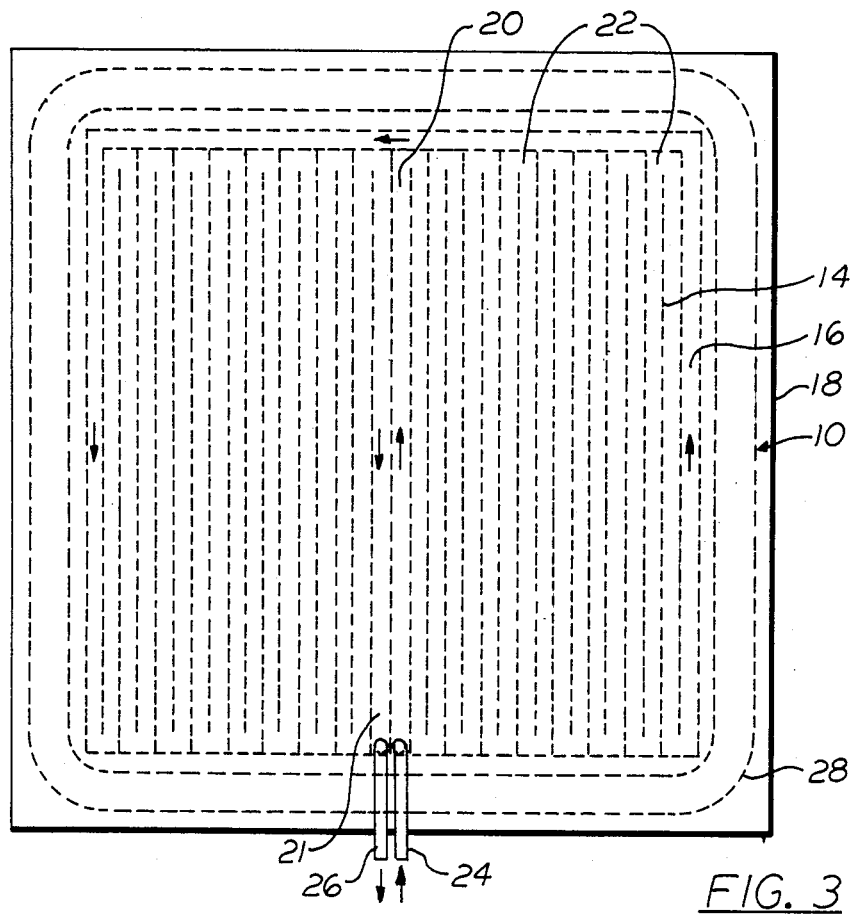
FIG. 3 is a plan view of a single panel spa cover with flow channels shown in phantom.
Figure 4:
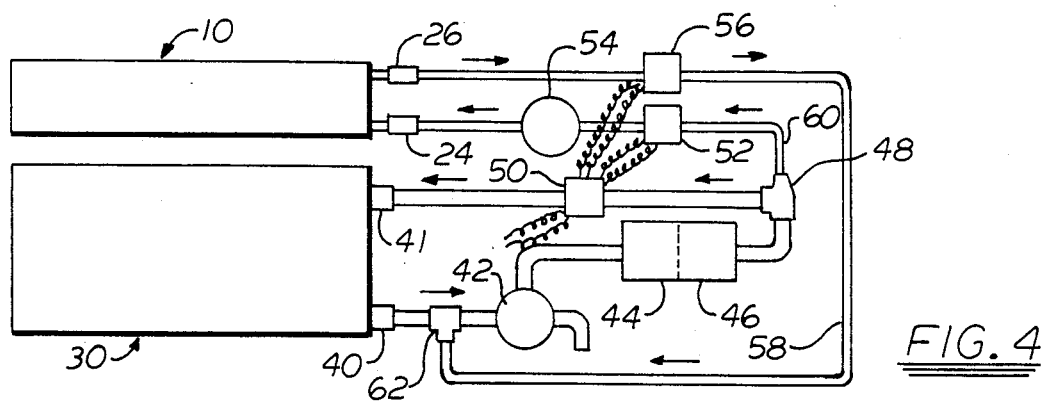
FIG. 4 is a water circulation diagram showing the flow of water between the spa and the cover.

A quick release connection inlet fitting 24 is attached to the first channel 20 so that water flows in a maze-like pattern in accordance with the arrows set forth in FIGS. 1, 3 and 4. The last channel 21 is connected to an outlet fitting 26 so that the water flows into the spa as set forth hereafter.

It is expected that smaller spas will have a single cover 10 as shown in FIG. 3. However, in larger spas, for easy removal and application of the cover, two or more panels may be desirable as shown in FIG. 1. The cover half 10 is identical to cover half 10a. The two covers, 10 and 10a are connected by tubing 64 so that after the water is heated on one side in cover 10, it flows over to 10a to be heated in channels 16a of cover 10a. In this instance, the last channel 21 is in separate cover 10a instead of cover 10. The two covers may be laid side by side and a panel 45 used to close the opening across the spa between the two cover panels. Alternatively, the two cover panels 10 and 10a can be hinged 47 so that after the water is out of the channels 16 and 16a, the two panels may be lifted off the spa and folded together for storage in a more compact manner.

It is expected that the wall thickness of the bottom portion 12 of the cover 10 will be 1/16" to 3/16" and the channels 16 less than an inch in diameter; i.e., approximately ¼" deep and ⅜" wide. Of course, depending upon the size of the cover and the hot tub to be heated, these dimensions can vary as can be appreciated by one having ordinary skill in this art.

Figure 2:
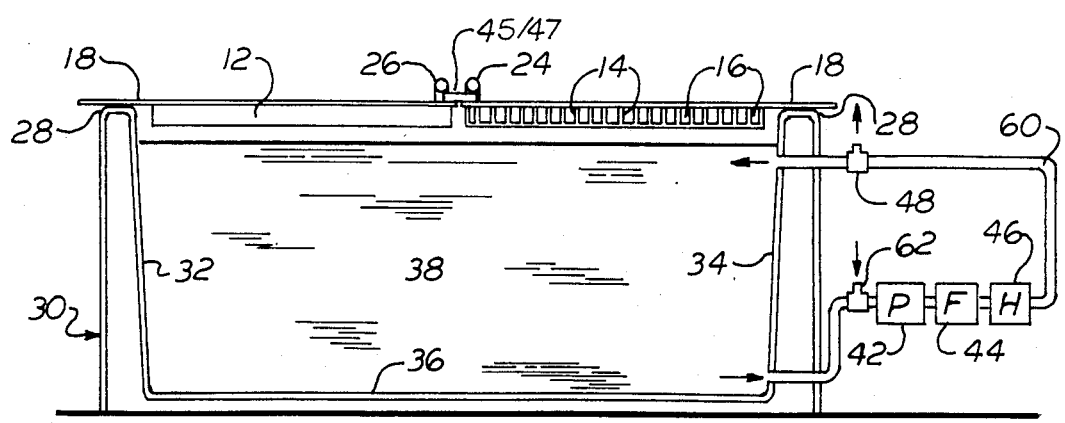
FIG. 2 is a cut away elevation of a multipanel spa cover mounted on a spa.

The flow cycle for the cover and spa is set forth in FIG. 4 and is further explained in FIG. 2. The heated water in the spa cover 10 flows out of the quick release fitting 26 through a flexible hose connection 58 and through a thermostatically operated valve 56 and then through the suction return connector 62. The water then flows through a circulating pump 42, a filter 44 and an optional auxiliary heater 46. The circulating pump will vary in H.P. and volume pumped depending upon the circulation system employed for the spa. The auxiliary heater is in the system to provide for poor weather conditions when not enough sun is available to heat the water in the cover 10.

The water flows through a thermostat 50, controlling valves 56 and 52 and then into the spa 30 through fitting 41. The setting on the thermostat will determine the water temperature in the spa. The water coming out of the spa through fitting 40 must again go through the return connector 62, through the circulating pump 42, through the filter 44, the auxiliary heater 46 and through fitting 48 connecting to the spa reservoir 38. If the water needs warming, it goes through tubing 60, valve 52 and optional booster pump 54 to the inlet fitting 24 from which it goes directly into the first channel 20 of the cover 10. Booster pump 54 may use up to ½ H.P., depending upon the distance between the circulating water pumping equipment and the cover.

The spa 30 is of varying dimensions having, of course, sidewall 32 and 34 and a bottom 36 with a water reservoir 38. The coping 28 at the top of the spa is used to support the spa cover 10. The dimensions of the cover 10 can be varied to accommodate any size or shape spa or any type of fixture going into the spa.

It is preferable that the cover top 18 be black to absorb maximum sunlight.

The quick release fitting 24 and 26 can be of any commercial type such as sold under the brand name SWAGELOK or HANSEN to accommodate frequent placement and removal of the cover 10. These fittings are made of stainless steel but could be made from impact resistant plastics.

In addition to the heat and energy conservation achieved, the rigid cover of this invention provides a safety device to prevent small children from entering an unattended spa.

Having thus described the invention, what I claim and desire to be secured by Letters Patent is:

1. A solar conductive portable cover for a spa having an opening for access thereto comprising a rigid plastic member vacuum formed in a series of interconnected parallel U-shaped channels each channel separated from an adjacent channel by a wall, a shape conforming plastic top solvent or heat welded to a top surface of the walls to form a cover wider in diameter than the opening of the spa such that the cover rests on coping at the top of the spa, each alternate wall having an opening at the same end of the channel and walls intermediate the alternate walls having an opening at the opposite end of the channels so that water can move freely from channel to channel in a maze like pattern from an inlet fitting attached to a first channel to an outlet fitting attached to the channel furthest away in the water flow pattern from the first channel, the inlet fitting and outlet fitting being capable of attachment to tubing leading to a spa water reservoir.

2. A solar conductive spa cover according to claim 1 wherein two or more covers are held together with a hinge and connected by tubing attached to one inlet and one outlet fitting from each cover so that water flows through all the covers before re-entering the spa.

3. A solar conductive portable cover according to claim 1 wherein the channels are less than one inch in diameter.

4. Method for heating water for a spa comprising covering the top of the spa with a portable rigid thin plastic member forming a cover wider than the opening of the spa such that the cover rests on coping at the top of the spa and having a series of parallel U-shaped channels therein, each channel separated from an adjacent channel by a wall, a shape conforming plastic top adhered to a top surface of the walls, each alternate wall having an opening at the same end of the channel and walls intermediate the alternate walls having an opening at the opposite end of the channel, then pumping water from the spa reservoir into an inlet fitting connected to a first channel and moving the water throughout the channels of the cover in a maze-like fashion from the first channel to a channel furthest away in the water flow pattern from the first channel and then through an outlet fitting to the water feed system to the spa reservoir.

5. Method, according to claim 3 wherein the portable rigid thin plastic member consists of two panels hinged together and at least one flow channel from each is joined by a plastic tubing.

* * * * *